United States Patent [19]
Murray, Jr.

[11] 3,828,348
[45] Aug. 6, 1974

[54] SYSTEM FOR MINIMIZING MULTIPLE TIME AROUND ECHOS IN A COHERENT-ON-RECEIVE-DOPPLER RADAR

[75] Inventor: John S. Murray, Jr., Berkeley, Calif.

[73] Assignee: Hughes Aircraft Company, Culver City, Calif.

[22] Filed: Oct. 21, 1971

[21] Appl. No.: 191,537

[52] U.S. Cl. .................................. 343/7 A, 343/7.7
[51] Int. Cl. ............................................ G01s 9/42
[58] Field of Search ........................... 343/7 A, 7.7

[56] References Cited
UNITED STATES PATENTS

| | | | |
|---|---|---|---|
| 2,427,523 | 9/1947 | Dolberg et al. ............... | 325/22 X |
| 2,668,286 | 2/1954 | White ........................... | 343/7.7 |
| 2,943,318 | 6/1960 | Deloraine et al. ........... | 343/6.8 R X |
| 3,228,028 | 1/1966 | Baum et al. .................. | 343/7.7 X |
| 3,623,096 | 11/1971 | Morris ........................... | 343/7.7 |

Primary Examiner—Malcolm F. Hubler
Attorney, Agent, or Firm—Don O. Dennison; W. H. MacAllister

[57] ABSTRACT

Target returns at the output of the doppler filters of the coherent-on-receive-doppler radar receiver are selectively applied to first and second pluralities of comparators. Those target returns above a first predetermined threshold level are applied through the first plurality of comparators to an inhibit circuit. Those target returns above a second predetermined threshold level are selectively applied from the second plurality of comparators to a plurality of gate circuits which in turn drive a control circuit to disable the inhibit circuit when a multiple time around target return is sensed and to enable the inhibit circuit to pass coherent moving target returns to a display unit when no multiple time around target return is sensed.

11 Claims, 9 Drawing Figures

SYSTEM FOR MINIMIZING MULTIPLE TIME AROUND ECHOS IN A COHERENT-ON-RECEIVE-DOPPLER RADAR

GOVERNMENT CONTRACT

The invention herein described was made in the course of or under a contract with the United States Navy.

BACKGROUND OF THE INVENTION

1. Field of the Invention

This invention relates to systems for eliminating clutter and particularly to a system for substantially eliminating multiple time around echo signals in a coherent-on-receive doppler radar.

2. Description of the Prior Art

In a coherent-on-receive-doppler-system (CORDS), an amount equal to the phase of the transmitted pulse is subtracted from the phase of all signals returned within the first pulse repetition time (1/PRF) following the transmission of the transmitted pulse. In this manner a train of pulses which are random in phase with respect to each other on transmission are given uniform phases on receive, and phase information as well as amplitude information may be processed in order to discriminate between moving and stationary signal scatters.

The second time around echo (STAE) return, as well as any other multiple time around echo (MTAE) return, by definition is received at the antenna at a time greater than 1/PRF following the transmission of the pulse responsible for the MTAE return. The CORDS circuitry shifts the phase of each MTAE return by an amount unrelated to the phase of the transmitted pulse which produced the MTAE return. Since the MTAE signal is improperly phase corrected, it remains completely non-coherent and appears as broadband noise to the CORDS signal processing circuits. While the STAE (or MTAE) signal power may be relatively weak, fluctuations in its level can perturb the CORDS target detection circuits enough to produce false alarms on a radar display unit.

There is no known prior art for effectively eliminating MTAE signals in a CORDS-type radar system. The method that has been tried to reduce MTAE signals in a CORDS radar is to jitter the PRF. However, the use of this method did not eliminate the MTAE targets, but rather smeared them. The use of fast automatic gain control (AGC) will not reduce the MTAE problem, since MTAE returns are generally weak and not capable of seriously affecting AGC circuits. Basically, an MTAE return is a problem, not because of its gross power, but because it falls within the "clutter-free" region of the frequency spectrum.

SUMMARY OF THE INVENTION

Briefly, applicant has provided a system for inhibiting the CORDS video ordinarily sent to the radar display unit by monitoring the output of preselected doppler filters and causing an inhibit circuit to generate an inhibit signal whenever there is activity spread across the preselected doppler filters due to a non-coherent MTAE return.

It is therefore an object of this invention to provide a system for eliminating MTAE in a CORDS-type radar system.

Another object of this invention is to provide an improved CORDS radar system.

Another object of this invention is to provide a novel, relatively simple system for removing false alarms due to multiple time around echo returns in a CORDS signal processor.

A further object of this invention is to provide a system for output of preselected doppler filters and inhibiting the CORDS video ordinarily sent to a radar display unit whenever an MTAE return is sensed.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein.

DESCRIPTION OF THE PREFERRED EMBODIMENT

Figure 1:
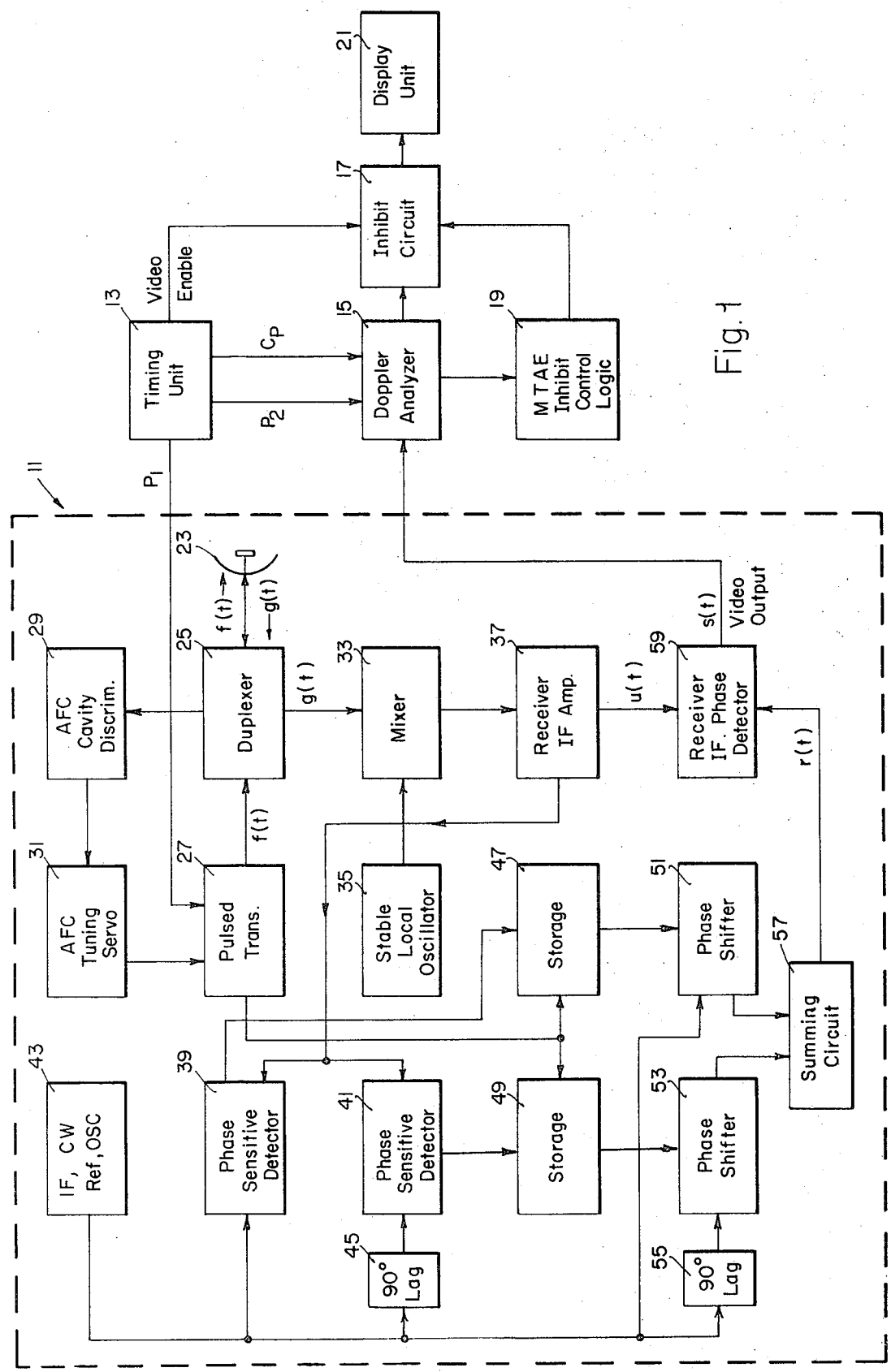
FIG. 1 is a schematic block diagram of a CORDS-type radar system in accordance with a preferred embodiment of this invention.

Referring now to the drawings, FIG. 1 illustrates a schematic block diagram of a preferred embodiment of this invention. A coherent-on-receive doppler system (CORDS) or radar circuit 11 for developing coherent video when a non-coherent transmitter is being utilized is shown encompassed by dashed lines. The radar circuit 11 is similar to the system described in the United States patent application, Ser. No. 465,792, filed on June 21, 1965. A timing unit 13 provides suitable timing signals or pulses, such as $P_1$, $P_2$, $C_p$ (clock pulses) and a video enable signal, for the proper operation of the system of FIG. 1. In response to the $P_2$ and $C_p$ signals, a doppler analyzer 15 analyzes the coherent video output from the radar circuit 11 to remove first time around stationary targets (fixed target returns, such as ground clutter, returned within the interpulse period following the transmission of a radar pulse) and to allow moving target return signals and any multiple time around echo (MTAE) signals to be applied to an inhibit circuit 17. An MTAE (multiple time around echo) inhibit control logic circuit 19 monitors the operation of the doppler analyzer 15 in order to provide an output to disable the inhibit circuit 17 when a multiple time around target return, which is non-coherent, is sensed, and to allow the inhibit circuit 17 to pass coherent moving target returns to a display unit 21 when no multiple time around target return is sensed and a video enable signal is present. The doppler analyzer 15, inhibit circuit 17 and MTAE inhibit control logic 19 will be subsequently discussed in more detail. The radar circuit 11 will now be discussed.

Structurally, the radar circuit 11 includes a transmitter section and a receiver section which are electrically isolated from one another and are alternatively connected to an antenna 23 by means of a duplexer 25. A pulsed transmitter 27, which may be a magnetron, may be maintained at a frequency within a fraction of a MHz of a prescribed nominal frequency by a feedback circuit including an automatic frequency control (AFC) cavity discriminator 29 that generates an output signal having an amplitude proportional to frequency variations for controlling an AFC tuning servo 31. The AFC tuning servo 31 develops an output to change the frequency of the magnetron transmitter 27. The result of this feedback circuit is to tune the frequency of the magnetron 27 to essentially that of the cavity discriminator 29. It should be understood that the radar circuit 11 is not limited to the radar illustrated but can be of any other classical design including klystron types.

In response to the $P_1$ pulse from the timing unit 13, a main bang waveform (FIG. 2) of pulses of rf energy is generated by the magnetron transmitter 27 and fed through the duplexer 25 to the antenna 23 where the energy is radiated into space. This main bang waveform can be represented by the function:

(1) $f_i(t) = A_i \cos(\omega_o t + \phi_i)$ where:
   $A_i$=amplitude of $i^{th}$ pulse
   $\omega_o$=carrier frequency
   $\phi_i$=random phase variation (radians)

Figure 2:
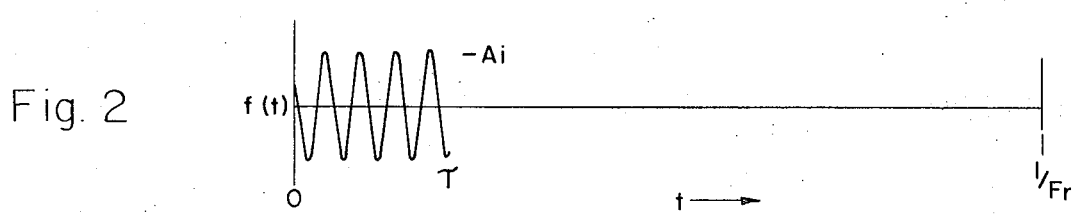
FIGS. 2–6 are graphs illustrating representative voltage waveforms for voltage signals generated within the radar circuit 11 of FIG. 1.

It should be understood that the graphical waveforms are not the actual waveforms since FIG. 2 is merely intended to illustrate the random phase variation of $\phi_i$ of the rf carrier $\omega_o$ from pulse-to-pulse, and the resultant phase shift in the transmitted signal. Consequently, the graph and all subsequent graphs have been made as simple as possible and are merely representative of the actual waveforms. The rf carrier $\omega_o$ can, for instance, actually be in the x-band with a carrier of 9,375.0 MHz, have a pulse duration of from 0.5 microseconds to 0.15 microseconds, and an interpulse period of 5,000 microseconds. It should be understood that these need not be the actual values used and, in fact, they may not even be the best values. These values have only been selected in order to make the description as definite as possible.

Since the duplexer 26 does not provide perfect electrical isolation between the transmitter section and the receiver section, a portion of the transmitted energy leaks through the duplexer 25 and can be applied to a mixer 33. The mixer 33 combines or heterodynes the leakage signal with an rf signal from a stable local oscillator 35 to generate an IF signal. This IF signal can, for example, be about 30 MHz. The mixer 33 can be of any classical type used in conventional radar circuits. The local oscillator 35 must have sufficient short term stability to preserve phase coherence over the interpulse period. Thus, an IF signal is generated for each magnetron transmission pulse. A receiver IF amplifier stage 37 receives and amplifies the heterodyned IF output from the mixer 33 and feeds it to a phase-correcting circuit. The mixer 33 also heterodynes a modulated echo signal $g(t)$ of FIG. 3 at some later time $2R/c$ where:

(2) $g(t) = KA_i \cos[\omega_o(t - [2R/c]) + \phi_i]$
   $(2R/c) \le t \le (2R/c) + \tau$; and 0 at all other times where:
   $c$=propagation velocity
   $K$=attenuation factor
   $R$=one way range to target The heterodyning in the mixer 33 of the modulated echo signal $g(t)$ with the output of the oscillator 35 generates a modulated IF echo signal which is also amplified by the IF amplifier 23. However, the operation of the phase-correcting circuit will be described first since, then, the reason for phase-correcting the main bang IF signal to eliminate the $\phi_i$ random phase variation in the transmit signal can be better understood.

The phase-correcting circuit operates generally in the following manner. The main bang IF signal output from the IF amplifier 37 is phase compared at two phase detectors 39 and 41 with the phases of two IF reference signals generated by a common c-w (clock) reference oscillator 43. One of these two reference signals is phased 90° with respect to the other by a 90° lag circuit 45. The resultant phase error signals from the phase detectors 39 and 41 are video pulses having amplitudes proportional to the sine and to the cosine of the phase difference between the compared signals and are stored in storage means 47 and 49, respectively, for the remainder of the interpulse period $1/fr$.

Figure 4:
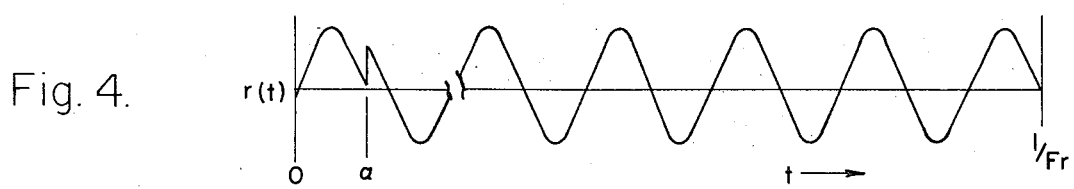

The stored voltage signals are each applied to an individual one of two phase shifter circuits 51 and 53 which operate to shift the phase of the two reference signals from the c-w (clock) oscillator 43 in proportion to the error voltages. One of these two reference signals is phase shifted 90° with respect to the other by a second 90° phase lag circuit 55. These reference signal outputs from the phase shifters 51 and 53 are summed or added together in a summing circuit 57 to develop the resultant phase-shifted IF signal $r(t)$ of FIG. 4:

(3) $r(t) = B \cos[\omega_{IF}(t - \alpha) + \phi_i]$
   $\alpha \le t \le (1/fr)$; and 0 at all other times where:
   $B$=amplitude of phase-corrected IF reference
   $\omega_{IF}$=IF frequency (30 MHz)
   $\alpha$=time required to phase sense and phase correct $\phi_i$=main bang carrier phase variation This phase-shifted IF signal $r(t)$ is then applied to a receiver IF phase detector 59 at the receiver output. Thus, the phase of the reference signals will be continually adjusted once each interpulse period to correspond to random phase variations $\omega_i$ in the transmitted rf carrier of the magnetron. As a result, when the corresponding echo signal is received it will be coherent with the phase-shifted IF reference.

The advantages of phase-correcting the IF reference signal $r(t)$ for each transmitted pulse $f_i(t)$ will now be explained. As previously discussed, the characteristic operation of a magnetron transmitter is such that the initial phase $\phi_i$ of the rf carrier $\omega_o$ varies in a random manner from pulse to pulse. That is, the main bang signal $f_i(t)$ could be described by the mathematical function:

(1) $f_i(t) = A_i \cos(\omega_o t + \phi_i)$

Figure 3:
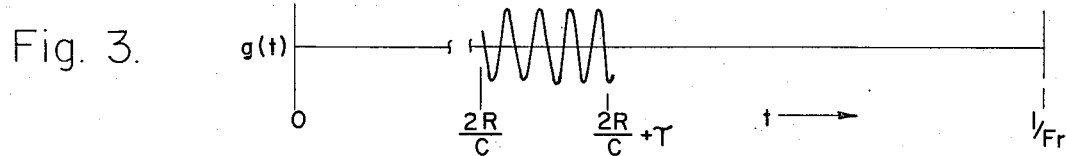

When the main bang energy is reflected from an isolated point reflector, the resultant received echo signal $g(t)$, as shown in FIG. 3, has a carrier signal substantially identical to the above function except with a time delay and an amplitude decrease due to energy losses during transmission and reflection. The echo signal $g(t)$ can be represented by the function:

(2) $g(t) = KA_i \cos[\omega_o(t - [2R/c]) + \phi_i]$ In other words, the echo signal arrives at the antenna 23 after a time delay equal to the propagation velocity ($c$) of the energy divided into the two-way distance ($2R$) from the antenna 23 to the reflecting point.

Figure 5:
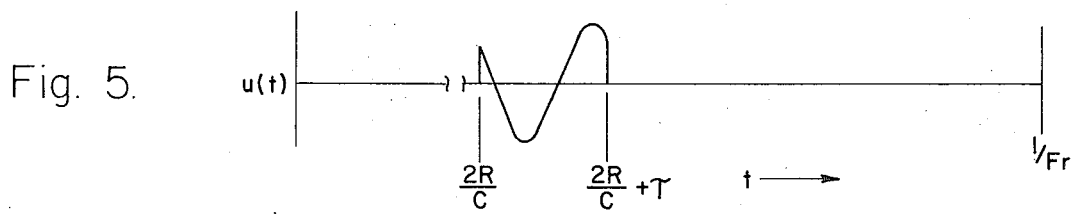

On receive, the duplexer 25 isolates the magnetron transmitter 27 from the antenna 23 and connects the receiver circuit to the antenna 23. Thus, the echo signal $g(t)$ is fed to the mixer 33 where it is heterodyned against the output signal of the local oscillator 35 to generate a modulated IF output signal having the same characteristic frequency of the phase-shifted IF c-w reference oscillator 43 (30 MHz). The IF echo signal is then amplified by the receiver IF amplifier 37 and applied to the phase detector 59 at the receiver output. Since the RF echo signal is substantially identical to the transmitted signal but with a time delay and change in amplitude the IF echo signal $u(t)$ of FIG. 5 will be substantially in phase with the phase-shifted IF c-w reference signal $r(t)$ applied to the other input of the phase detector 59 except for the phase component due to the time delay $(2R/c)$ and can be represented by the function:

(4) $u(t) = KA_i \cos[\omega_{IF}(t - [2R/c]) + \phi_i]$ $(2R/c) \le t \le (2R/c) + \tau$, and 0 at all other times.

Figure 6:
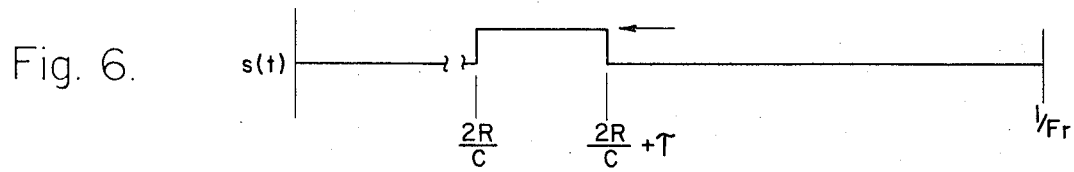

The output signal $s(t)$ (FIG. 6) of the receiver IF phase detector 59 can be represented by the function:

(5) $s(t) = r(t) \, u(t) = K(A_iB/2) \cos \omega_{IF} (2R/c) - \alpha$ $(2R/c) \le t \le (2R/c) + \tau$, and 0 elsewhere. Since the phase of the IF reference signal $r(t)$ is dependent upon the RF phase of the main bang pulse most recently transmitted, the output signal $s(t)$ of the phase detector 59 will be a pulse whose amplitude is uniquely related to the phase shift resulting from the time delay $(2R/c)$ but with essentially no amplitude dependence upon the random RF phase $\phi_i$ of the transmitter main bang output. Thus, the coherent video output of the phase detector 59 can be used to detect minute changes in the time delay from objects of interest since the RF phase variations from successive transmitter pulses are effectively removed in the output of the phase detector 59, leaving pulses whose amplitudes are essentially independent of the random transmitter RF phase variations.

Figure 7:
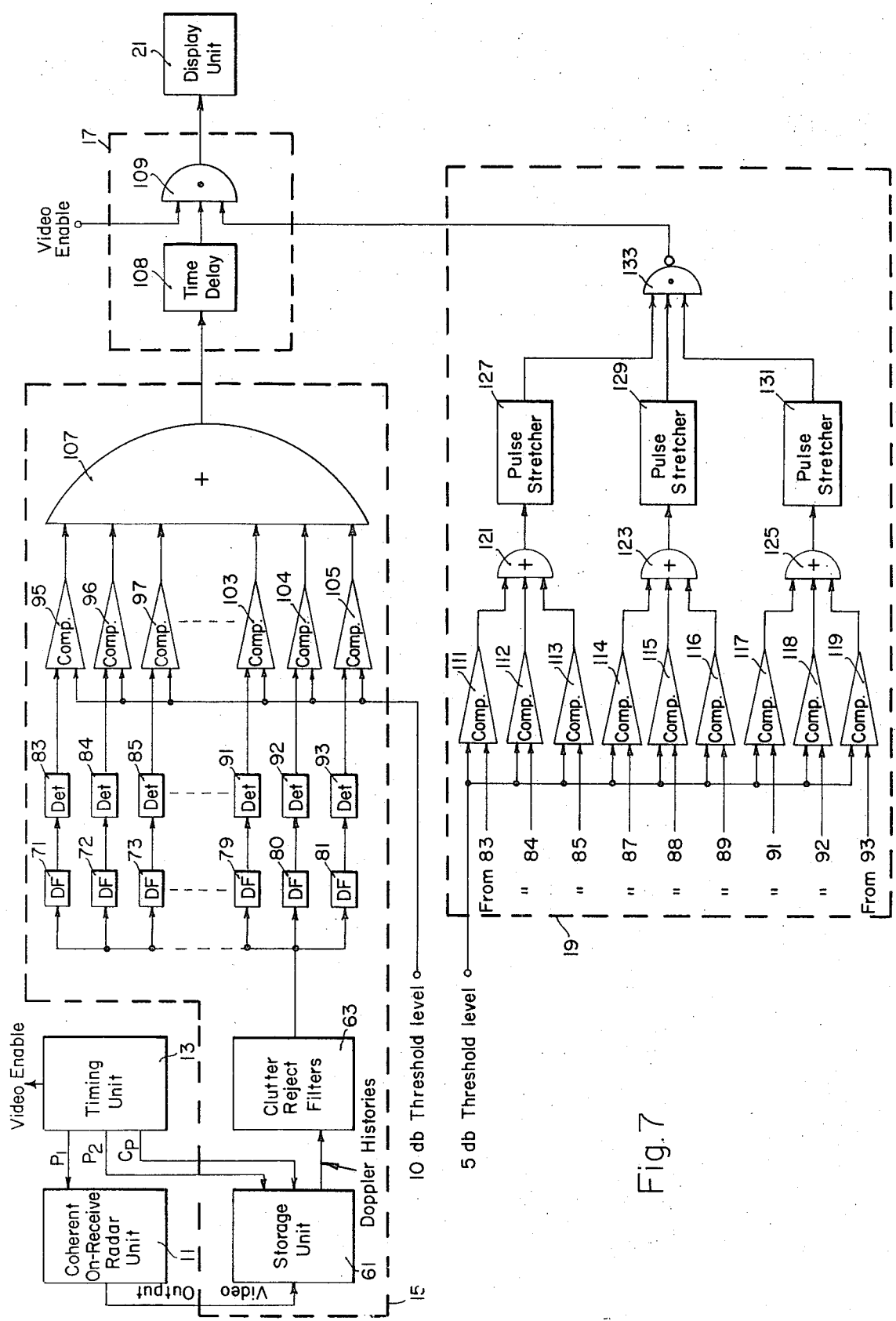
FIG. 7 is a schematic block diagram illustrating in more detail the doppler analyzer 15, inhibit circuit 17 and MTAE inhibit control logic 19 of FIG. 1.

Although the radar circuit 11 develops a coherent video output for any signal returned within the interpulse period following the transmission of the radar pulse causing the signal return, an MTAE signal return cannot be made coherent since it is received from a signal scatterer beyond the maximum unambiguous range. As a result of the CORDS circuitry in the radar circuit 11 shifts the phase of each MTAE return by an amount unrelated to the phase of the transmitted pulse which produced the MTAE return. Since the MTAE signal is improperly phase corrected, it remains completely non-coherent and appears as broadband noise at the output of the radar circuit 11. The circuitry for substantially eliminating these MTAE signals returns to prevent them from being displayed as false alarms on the display unit 21 will now be explained by referring to FIG. 7.

The coherent and non-coherent video signal returns occurring in the range sweeps are applied to the doppler analyzer 15. A storage unit 61 in the doppler analyzer 15 stores the video signals in range bins as they come in during each range sweep, and then reads out the doppler histories for each range bin of the video signals. The storage unit 61 may include first and second block memory units (not shown) which respond to suitable timing pulses $P_2$ and $C_p$ from the timing unit 13 for storing the range sweeps in the first memory unit and orthogonally reading out from the second memory unit previously stored range sweeps to develop the doppler histories for each range bin during one cycle of operation. On the next cycle of operation the range sweeps are stored in the second memory unit, while the doppler histories are read out from the first memory unit for each range bin. Subsequent cycles of operation alternate in the above-described manner. The storage unit 61 may be similar to the system described in the pending patent application Ser. No. 880,630, filed Nov. 28, 1969, for performing this type of scan conversion. However, it should be understood that any other conventional or suitable mechanization of the storage unit 61 for converting range sweeps into doppler histories is equally applicable.

The doppler histories from the storage unit 61 are applied to clutter reject filters 63, which remove the clutter signals returned from patches of ground clutter in the unambiguous range, and pass the remaining coherent moving targets and MTAE signals to a plurality of doppler filters 71 through 81 in the zero to PRF/2 portion of the spectrum. Each of the doppler filters 71 through 81 responds to a different center frequency within the pass band of the clutter reject filters 63. Since an MTAE signal appears at the inputs of the doppler filters 71–81 as broadband noise, it will cause many, if not all, of the doppler filters 71–81 to develop outputs in response thereto. The outputs of the doppler filters 71–81, which includes coherent first time around moving targets and non-coherent MTAE targets, are respectively envelope detected by detectors 83 through 93 before being passed to comparators 95 through 105, whereby they are each compared with a voltage set at a threshold level 10 decibels (db) above the noise level. By setting the threshold level 10 db above the noise level, the possibility for random noise to cause a false alarm is reduced to an acceptable value.

The target outputs from the comparators 95–105 are applied through an OR gate 107 to a time delay circuit 108 contained in the inhibit circuit 17. The time delay circuit 108 may be a delay line having, for example, 2 microseconds ($\mu$sec) of delay. A delay time is necessary to give the MTAE inhibit control logic circuit 19 sufficient time to make a logical decision as to whether or not a particular target is a MTAE return. The output from the time delay 108 is applied to the display unit 21 via an AND gate 109 whenever a logical 1 state from the logic circuit 19 and a logical 1 state video enable signal from the timing unit 13 are also applied to the AND gate 109. The video enable signal may be a gate voltage positionable in time and range duration to enable a desired radar range to be monitored by the display unit 21.

At the same time that the doppler filters 71–81 are developing target outputs, the envelope-detected outputs of the doppler filters 71, 72, 73, 75, 76, 77, 79, 80 and 81 are each compared in comparators 111 through 119, respectively, with a voltage set at a threshold level five db above the noise level. Due to the lower threshold the output of each of the comparators 111–119 is an exaggerated version of what is happening in the comparators 95–105 in the doppler analyzer 15. A small instantaneous increase in noise level contributed by a particularly strong reflector in a STAE or MTAE region can easily be sensed and the information used to generate a logical inhibit decision in the control logic circuit 19.

The comparators 111–119 monitoring the signal energy at nine different frequencies are illustratively assembled in three groups of three in such a way that activity in all three groups simultaneously means the signal in the comparators 95–105 of the doppler analyzer 15 at that time is probably due to broadband noise and should be inhibited. More specifically, the outputs from the comparators 111, 112 and 113 are applied to an OR gate 121; the outputs from the comparators 114, 115 and 116 are applied to an OR gate 123; and the outputs from the comparators 117, 118 and 119 are applied to an OR gate 125. Ten μsec are added to the length of each pulse coming from the OR gates 121, 123 and 125 by pulse stretchers 127, 129 and 131, respectively. The outputs of the three pulse stretchers 127, 129 and 139 comprise the inputs to a NAND gate 133 which generates a logical 0 state signal used to inhibit the video applied to the AND gate 109 whenever the outputs of the pulse stretchers 127, 129 and 131 are all true at the same time. In other words, an inhibit signal is generated by the NAND gate 133 whenever each separate comparator group (comparators 111–113, 114–116, and 117–119) has had a threshold crossing in at least one channel within 10 μsec of a threshold crossing in each of the other two groups.

An MTAE signal causes broadband noise to be spread across a number of the doppler filters 71–81 in the zero to PRF/2 portion of the spectrum. As a result, the pulse stretchers 127, 129 and 131, at some time, all simultaneously develop true outputs which cause the NAND gate 133 to generate an inhibit pulse or logical 0 state signal to disable the AND gate 109 to prevent the MTAE signal from being displayed on the display unit 21. On the other hand, a coherent target appears in only a few adjacent doppler filters (usually one or two) and should not cause the NAND gate to generate an inhibit pulse.

Figure 8:
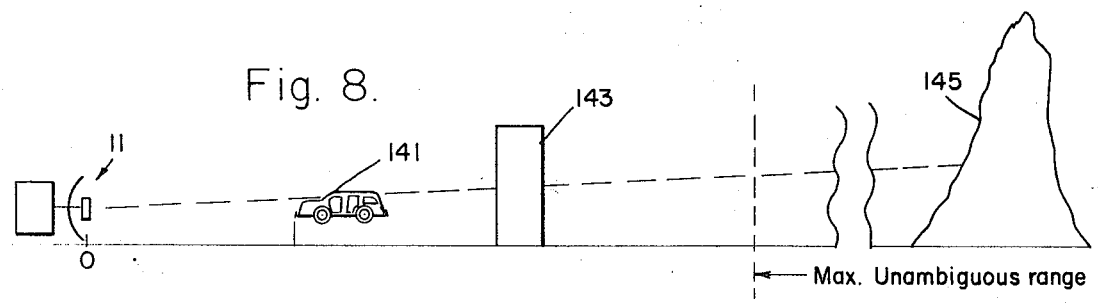
FIGS. 8 and 9 illustrate returns from various targets including an MTAE return.
Figure 9:
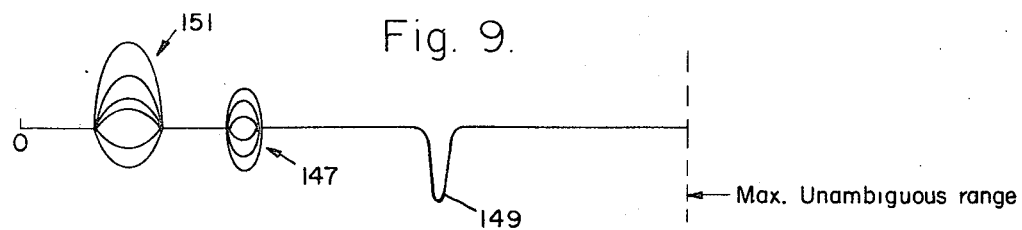

Reference will now be made to FIGS. 8 and 9 for a further illustration of returns from various targets including an MTAE return. In FIG. 8 the transmission of a radar pulse from the radar unit 11 is shown intercepting a moving target 141, a stationary target 143 and a target 145 beyond the maximum unambiguous range of the radar unit 11. The moving target 141 causes a waveform 147, having a uniform amplitude variation at the target doppler frequency, to be developed at the input of the clutter reject filters 63. The moving target return shown by the waveform 147 passes through the filters 63 and through one or two of the doppler filters 71–81 and is subsequently displayed on the display unit 21 as a moving target. The radar return from the stationary target 143 produces a waveform 149 which has no amplitude variation from pulse to pulse because its doppler frequency is zero. Consequently, waveform 149 is filtered out by the clutter reject filters 63. The target 145, which is illustrated as a stationary target but may be a moving target as long as it is beyond the maximum unambiguous range of the radar unit 11, causes the waveform 151 to be developed. Since the waveform 151 appears at a much closer range than that at which the target 145 is actually located, the waveform 151 represents the MTAE for the target 145. It should be particularly noted that the waveform 151 therefore has a random amplitude variation from pulse to pulse because of the non-coherence of the MTAE with a previous transmitter pulse which produced the MTAE return. As a result this MTAE return will readily pass through the filters 63 and most, if not all, of the doppler filters 71–81 since its non-coherence makes it look like broadband noise. However, as previously explained, the logic circuit 19, which monitred and sensed this broadband noise at the output of the doppler filters 71–81 generates an inhibit signal to prevent the AND gate 109 from passing the MTAE signal to the display unit 21.

It should be noted that, while only eleven doppler filters are shown for illustrative purposes, a much larger number of doppler filters may be employed in an operational CORDS signal processing system. For example, 64 doppler filters may be used. Even though additional doppler filters may be employed in the doppler analyzer 15, there is no necessity for increasing the number of comparators and other components in the MTAE inhibit control logic circuit 19. Through the proper selection of the doppler filters to be monitored by the circuit 19, the spectrum covered by the circuit 19 could still be monitored to detect broadband noise from MTAE signals without further affecting the complexity of the circuit 19.

It is important to note that the MTAE inhibit control logic circuit 19 is mechanized to block the video only during the time that a MTAE signal actually threatens to place a false alarm on the display unit 21. The circuit 19 typically inhibits only a minute fraction of the display unit 21 at a time and never causes any part of the display unit 21 to become permanently blocked.

The invention thus provides a system for discriminating against broadband noise in the presence of narrow spectrum signal returns by inhibiting the passage of a video signal to a radar display unit whenever the video signal appears to be a false alarm due to a multiple time around echo, which is broadband noise to the doppler analyzer 15 and the control logic 19.

While the salient features have been illustrated and described, it should be readily apparent that various circuit changes may be made within the scope of this invention. For example, a pulse width discriminator for clipping a predetermined portion from the leading edge of all pulses could be used in lieu of the time delay circuit 108 to give the logic circuit 19 sufficient time to make a logical decision. Another change which could be made could be the substitution of flip-flops with appropriate timing pulses from the timing unit 13 for the pulse stretchers 127, 129 and 131. One of many other circuit changes that could be made would involve the comparator groups in the control logic circuit 19 sampling the outputs of a different arrangement of the doppler filters 71–81. For example, the three comparator groups (111–113; 114–116; and 117–119) may respectively sample the outputs from the doppler filters 80, 73 and 74; 75, 76 and 77; and 78, 79 and 72. It should therefore be readily apparent to those skilled in the art that various changes, modifications and substitutions may be made within the spirit and scope of the invention as set forth in the appended claims.

What is claimed is:

1. A radar system comprising:
   a pulsed transmitter for transmitting pulses to intercept targets;
   a receiver for detecting target echo signals;
   a phase corrector circuit coupled to said transmitter and receiver for developing a coherent video output by establishing a phase coherency between each transmitted pulse and all first time around target echo signals;

a first circuit, coupled to said phase corrector circuit, being responsive to the coherent video output therefrom for providing video target signals containing no first time around stationary targets;

a control circuit coupled to said first circuit for providing an inhibit signal when a video multiple-time-around target signal is sensed; and a gate circuit, coupled to said control circuit and to said first circuit, being responsive to the inhibit signal from said control circuit for preventing the passage of video target signals therethrough only during the time that the inhibit signal is applied thereto.

2. A radar system comprising:

a pulsed transmitter for periodically transmitting a pulse of RF power at the beginning og each interpulse period of the radar;

a receiver for detecting target echo signals;

a phase correcting circuit coupled to said receiver and to transmitter for developing a coherent video output by establishing a phase coherency between each transmitted pulse and all target echo signals returned within the interpulse period following the transmission of the transmitted pulse;

first means, coupled to said phase correcting circuit, being responsive to the coherent video therefrom for providing video target signals containing no fixed target signals returned within the interpulse period following the transmission of the transmitted pulse causing the fixed target signals;

a control circuit coupled to said first means and being responsive to the video signals therefrom for providing an inhibit signal when a video target signal is sensed as being returned beyond the interpulse period following the transmission of a transmitted pulse;

a display unit for displaying video target signals; and a gating circuit, coupled between said first means and said display unit, being responsive to the inhibit signal for preventing video target signals from being displayed on said display unit only during the time that the inhibit signal is applied thereto.

3. The radar system of claim 2 wherein said gating circuit includes:

a video circuit coupled to said first means for delaying the video target signals therefrom for a predetermined time sufficient to allow said control circuit to generate the inhibit signal when a video target signal is sensed as being returned beyond the interpulse period following the transmission of a transmitted pulse; and a first gate coupled between said video circuit and said display unit for preventing video target signals from being displayed on said display unit during the time that an inhibit signal is applied thereto.

4. The radar system of claim 3 wherein said control circuit includes:

a second gate coupled to said first gate; and a plurality of gating circuits coupled between said first means and said second gate, being responsive to a plurality of signals from said first means, for respectively generating first signals to cause said second gate to generate an inhibit signal.

5. The radar system of claim 4 wherein said control circuit further includes a plurality of circuits respectively coupled to said plurality of gating circuits and being further coupled to said second gate for increasing the length of time that each first signal is applied to said second gate.

6. The radar system of claim 5 wherein said control circuit further includes a plurality of comparison circuits respectively coupled to said plurality of gating circuits and being adapted to receive the plurality of signals from said first means, said comparison circuits allowing those ones of the plurality of signals which exceed a predetermined threshold level to be applied to said plurality of gating circuits.

7. In a coherent-on-receive doppler radar adapted to receive fixed and moving target echo signals from both within and beyond the maximum unambiguous range of the radar and which includes a first unit for producing coherent-on-receive video from all echo signals returned from targets within the maximum unambiguous range of the radar, a doppler analyzer coupled to the first unit for preventing the passage therethrough of fixed target echo signals returned within the maximum unambiguous range of the radar while allowing moving target echo signals and any multiple time around target echo signals to be passed therethrough, and a display unit for displaying video target signals, a system for substantially preventing multiple-time-around target echo signals from being displayed on the display unit, said system comprising:

a control circuit coupled to the doppler analyzer for generating an inhibit signal when the doppler analyzer produces an output indicative of a multiple time around target echo signal; and an inhibit circuit, coupled to the doppler analyzer and to the display unit, being responsive to an inhibit signal from said control circuit for preventing video target signals from being displayed on the display unit while the inhibit signal is present and for allowing video target signals to be displayed on the display unit while the inhibit signal is not present.

8. The system of claim 7 wherein said control circuit includes:

a plurality of comparison means coupled to the doppler analyzer for selectively comparing levels of associated signals therefrom with a predetermined threshold level, each of said plurality of comparison means generating an output signal when the level of its associated signal exceeds the predetermined therehold level;

a first gate circuit coupled to said inhibit circuit; and a plurality of gating circuits, each coupled to selected ones of said comparison means and to said firat gate circuit, said gating circuits being responsive to a sufficient number of output signals from selected ones of said plurality of comparison means for developing first signals to cause said first gate circuit to generate an inhibit signal.

9. The system of claim 8 further including means coupled between said first gate circuit and said plurality of gating circuits for increasing the length of time that a first signal is applied to said first gate circuit.

10. The system of claim 8 wherein said inhibit circuit includes:

a second gate circuit coupled between said first gate circuit and the display unit for preventing video target signals from being displayed by the display unit only when the inhibit signal is applied thereto; and means coupled between said first unit and said second gate circuit for delaying the application of all video target signals to said second gate circuit to allow said control circuit sufficient time to generate the inhibit signal after a multiple-time-around target echo signal is sensed.

11. The system of claim 10 further including means coupled between said first gate circuit and said plurality of gating circuits for increasing the length of time that a first signal is applied to said first gate circuit.

* * * * *

PO-1050
(5/69)

UNITED STATES PATENT OFFICE
CERTIFICATE OF CORRECTION

Patent No. __3,828,348__      Dated __August 6, 1974__

Inventor(s) __John S. Murray, Jr.__

It is certified that error appears in the above-identified patent and that said Letters Patent are hereby corrected as shown below:

| | |
|---|---|
| Column 3, line 42 | change "26" to --25--. |
| Column 3, line 60 | change "g(t) = $KA_i$ cos [$w_o$(t - [2R/c] + $\varphi_i$]" to --g(t) = $KA_i$ cos [$w_o$(t - 2R/c) + $\varphi_i$]--. |
| Column 4, line 42 | change "$w_i$" to --$\varphi_i$--. |
| Column 4, line 63 | change "g(t) = $KA_i$ cos [$w_o$(t - [2R/c] + $\varphi_i$] to --g(t) = $KA_i$ cos [$w_o$(t - 2R/c) + $\varphi_i$]--. |
| Column 6, line 33 | change "whereby" to --where--. |
| Column 6, line 48 | change "1" to --"1"--. |
| Column 7, line 17 | change "0" to --"0"--. |
| Column 7, line 32 | change "0" to --"0"--. |
| Column 8, line 4 | change "monitred" to --monitored--. |
| Column 9, line 18 | change "og" to --of--. |
| Column 9, line 35 | between "video signals" insert the word -- target-- to read -- video target signals- |
| Column 10, line 52 | change "therehold" to --threshold--. |
| Column 10, line 56 | change "firat" to --first--. |

Signed and sealed this 3rd day of December 1974.

(SEAL)
Attest:

McCOY M. GIBSON JR.      C. MARSHALL DANN
Attesting Officer      Commissioner of Patents